United States Patent
Jessen et al.

(10) Patent No.: US 9,251,601 B2
(45) Date of Patent: Feb. 2, 2016

(54) AUTOMATIC IDENTIFICATION OF SINGLE- AND/OR FEW-LAYER THIN-FILM MATERIAL

(71) Applicant: Danmarks Tekniske Universitet, Lyngby (DK)

(72) Inventors: Bjarke Sørensen Jessen, Kgs. Lyngby (DK); Mikkel Buster Klarskov, Copenhagen N (DK); Lisa Katharina Tschammer, Valby (DK); Timothy John Booth, Virum (DK); Peter Bøggild, Copenhagen N (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 14/419,869

(22) PCT Filed: Aug. 13, 2013

(86) PCT No.: PCT/DK2013/050264
§ 371 (c)(1),
(2) Date: Feb. 5, 2015

(87) PCT Pub. No.: WO2014/026692
PCT Pub. Date: Feb. 20, 2014

(65) Prior Publication Data
US 2015/0199826 A1   Jul. 16, 2015

(30) Foreign Application Priority Data
Aug. 13, 2012 (EP) .................................... 12180234

(51) Int. Cl.
*G06K 9/00* (2006.01)
*G06T 7/40* (2006.01)
*G06T 7/00* (2006.01)

(52) U.S. Cl.
CPC ............... *G06T 7/408* (2013.01); *G06T 7/0083* (2013.01); *G06T 2207/10016* (2013.01);
(Continued)

(58) Field of Classification Search
CPC ................. G06T 7/0083; G06T 7/408; G06T 2207/10016; G06T 2207/10024; G06T 2207/10056; G06T 2207/20008; G06T 2207/30148
See application file for complete search history.

(56) References Cited

U.S. PATENT DOCUMENTS

| 6,236,459 B1 * | 5/2001 | Negahdaripour | A61B 3/101 356/496 |
| 7,522,762 B2 * | 4/2009 | Rea | G01M 11/00 382/141 |

(Continued)

FOREIGN PATENT DOCUMENTS

JP     2010-43987 A     2/2010

OTHER PUBLICATIONS

Berger, Michael "Graphene quality control goes industrial" as published (http://www.nanowerk.com/spotlight/spotid=20021.php) Feb. 7, 2011, nano werk.

(Continued)

*Primary Examiner* — Tom Y Lu
(74) *Attorney, Agent, or Firm* — Knobbe Martens Olson & Bear LLP

(57) ABSTRACT

One or more digital representations of single- (101) and/or few-layer (102) thin-film material are automatically identified robustly and reliably in a digital image (100), the digital image (100) having a predetermined number of color components, by—determining (304) a background color component of the digital image (100) for each color component, and—determining or estimating (306) a color component of thin-film material to be identified in the digital image (100) for each color component by obtaining a pre-determined contrast value ($C_R$; $C_G$; $C_B$) for each color component and multiplying the respective background color component with a numerical difference between the pre-determined contrast value ($C_R$; $C_G$; $C_B$) for a given color component and about 1,—identifying points or parts of the image with all color components being within a predetermined range of the determined or estimated color component.

16 Claims, 9 Drawing Sheets

(52) U.S. Cl.
CPC .............. *G06T 2207/10024* (2013.01); *G06T 2207/10056* (2013.01); *G06T 2207/20008* (2013.01); *G06T 2207/30148* (2013.01)

(56) References Cited

U.S. PATENT DOCUMENTS

2004/0208350 A1 10/2004 Rea et al.
2010/0273060 A1 10/2010 Yang et al.
2011/0076467 A1 3/2011 Huang et al.
2011/0299720 A1 12/2011 Nolen et al.

OTHER PUBLICATIONS

Moutinho, H.R. et al., "Thickness-Dependent Defect Structure of Epitaxial Silicon Thin Films Deposited by Hot-Wire Chemical Vapor Deposition" Photovoltaic Specialists Conference (PVSC), 37th IEEE, Jun. 19, 2011, pp. 3054-3058.
International Search Report for PCT/DK2013/050264 dated Oct. 15, 2013.

* cited by examiner

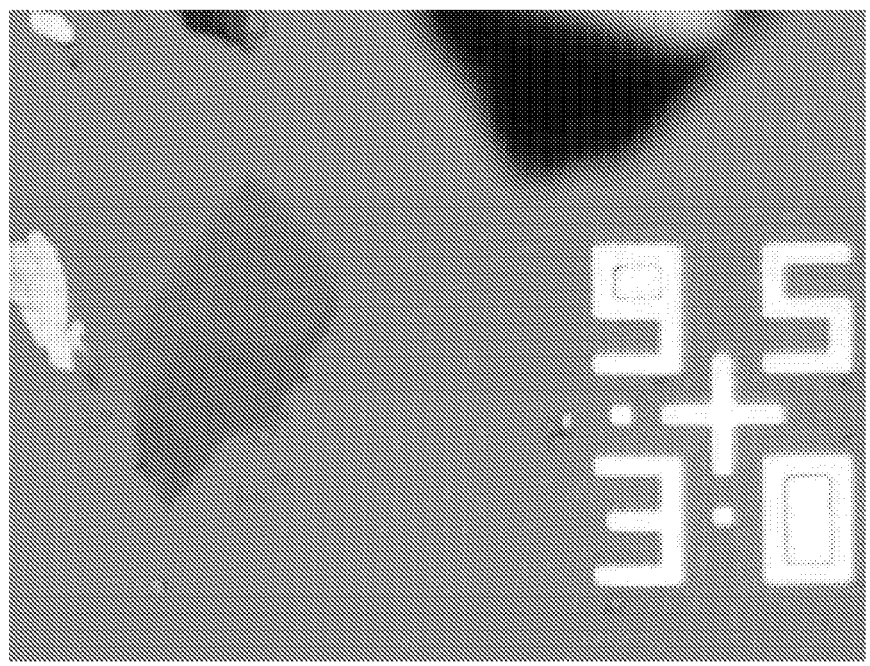
Figure 5a                 100
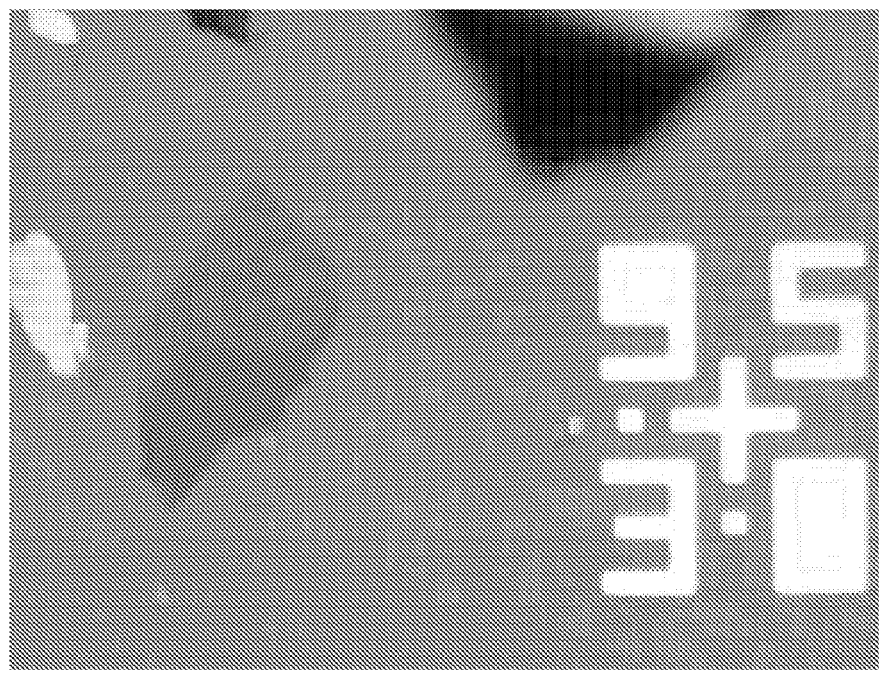
Figure 5b                 100

AUTOMATIC IDENTIFICATION OF SINGLE- AND/OR FEW-LAYER THIN-FILM MATERIAL

CROSS REFERENCE TO RELATED APPLICATIONS

This application is a U.S. National Phase Application of PCT International Application Number PCT/DK2013/050264, filed on Aug. 13, 2013, designating the United States of America and published in the English language, which is an International Application of and claims the benefit of priority to European Patent Application No. 12180234.2, filed on Aug. 13, 2012. The disclosures of the above-referenced applications are hereby expressly incorporated by reference in their entireties.

FIELD OF THE INVENTION

The present invention relates to a method of and a system for automatic identification of a digital representation of layered thin-film material, e.g. single-, and/or few-layer graphene, in a digital image.

Few-layer is to be understood to comprise up to 10 layers or more. Few-layer in this context specifically comprises single-, bi-, tri-, and four-layer.

BACKGROUND OF THE INVENTION

Graphene is a two dimensional material comprising a single layer of carbon atoms arranged in a honeycomb grid. It has many advantageous room temperature properties like almost twice the electrical conductivity of copper, more than ten times the thermal conductivity of silver, almost thirty times the electron mobility of silicon, about 5 times the tensile or Young's modulus of steel, and more than 45 times the tensile strength of diamond.

These properties enable many uses and improvements when using graphene.

High quality graphene may e.g. be obtained by a technique usually referred to as micro-cleaving or micro-mechanically cleaving or various exfoliation methods.

Alternatively, graphene can be 'grown' using chemical vapour deposition (CVD) methods. However, a drawback of CVD is that graphene typically is 'grown' on copper or nickel and then need to be moved to another usable substrate using a so-called transfer technique. Furthermore, each coherent area of graphene obtained in this way is relatively small, i.e. CVD graphene can be seen as comprising a larger number of much smaller adjacent graphene areas.

Graphene has a thickness of only 0.335 nm whereby characterization tools involving equipment such as atomic force microscope (AFM), scanning tunneling microscope (STM), or scanning electron microscope (SEM) often is used to properly and reliably identify graphene. However, using these techniques is time consuming and the equipment is also relatively costly.

Furthermore, given that coverage of research or similar grade single-layer micro-cleaved graphene is typically only some few thousand $\mu m^2$ on a 4" wafer or similar, such time consuming identification methods are not practical for large-scale production or research use.

Alternatively, manual identification of graphene—which is still used—is slow, tedious and/or error-prone, especially for fragmented samples. Typical time spent on manual identification of graphene is e.g. about 5 seconds pr. digital image and about 6-7 hours for a 4" wafer when digitised at an appropriate resolution needed to properly identify graphene.

Patent application US 2011/0299720 discloses to an automated approach for determining a number of atomic planes in layered material samples. According to one aspect, calibration is carried out for a thin film material under specific illumination conditions where a correlation is determined between the number of layers of the layered thin film material and a range of colour component values. The correlation is then used to determine the number of layers in a selected region of an image for another sample comprising the same material as used during the calibration. For accurate results, the image needs to be captured under the same illumination conditions as used during the calibration.

Calibration is carried out e.g. using micro-Raman spectroscopy and atomic force microscopy (AFM).

Once the calibration is carried out, it may be used for layer detection for other samples as long as the sample material and the calibration material is the same, the substrate for the calibration material and for the sample material is the same, and the illumination conditions stay the same.

However, it is not practically simple ensuring that illumination conditions truly stay the same and a given sample material will always have small variations e.g. in thickness, even across the sample material.

Thus, there is a need for an automated simple, reliable, robust, and/or efficient way of identifying graphene and/or other thin-film materials in a digital image.

OBJECT AND SUMMARY OF THE INVENTION

It is an object to enable automated robust and reliable identification of graphene and/or other thin-film materials.

A further object is to enable this identification in a simple and/or efficient way.

According to one aspect, one or more of these objects are achieved at least to an extent by a method of automatically identifying one or more digital representations of single- and/or few-layer thin-film material in a digital image, the digital image having a predetermined number of colour components, and the method comprising determining a background colour component of the digital image for each colour component, and determining or estimating a colour component of thin-film material to be identified in the digital image for each colour component, the thin-film material to be identified having a given number of layers being at least one, wherein determining or estimating a colour component of thin-film material to be identified in the digital image for each colour component comprises obtaining a pre-determined contrast value for each colour component and determining or estimating the colour component of the thin-film material to be identified and having the given number of layers for each colour component by, for each colour component, multiplying a numerical difference between the pre-determined contrast value for a given colour component and about 1 with the background colour component for the given colour component, and wherein the method further comprises identifying one or more digital representations of single- and/or few-layer thin-film material as points or parts of the digital image that, for each colour component, has a colour component being within a predetermined range of the determined or estimated colour component of the thin-film material to be identified having the given number of layers.

In this way, robust and reliable identification of layered thin-film material in a digital image is provided since identification is made based on the actual colour of the background and then the actual colour of the thin-film material is derived using information about contrasts.

Furthermore, this is provided without the need for calibration involving expensive and/or time-consuming equipment like such as atomic force microscope (AFM), scanning tunneling microscope (STM), or scanning electron microscope (SEM).

Additionally, the identification works on digital images obtained by relatively cheap and standard equipment.

This identification may be used on all types of layered thin-film materials, where a given contrast corresponds to a given layer, e.g. single-layer, of the thin-film material. For graphene, it is currently possible to distinguish at least 10 layers. For other thin-film materials, it may be possible to distinguish even more layers and of course also fewer.

It should be understood, that by numerical difference between the pre-determined contrast value for a given colour component and about 1 is meant the absolute value of the difference between the pre-determined contrast value for a given colour component and about 1, i.e. only the numerical difference is needed, not the sign of the difference and/or the order of the parameters in the differentiation.

Using the numerical difference between the pre-determined contrast value for a given colour component and exactly 1 should ideally give the most exact result but it is to be understood that using values close to 1 may still give usable results where the preferred degree of how close to 1 the value should to be may depend on actual application. Examples of a value to use instead of exactly 1—e.g. depending on actual application—are e.g. values from 0.95 to 1.00; values from 0.90 to 1.00; values from 1.00 to 1.05; values from 1.00 to 1.10 with e.g. 1.00; 0.99; 0.98; 0.97; 0.96; 0.95; 0.94; 0.93; 0.92; 0.91; 0.90; 1.01; 1.02; 1.03; 1.04; 1.05; 1.06; 1.07; 1.08; 1.09; 1.10 being specific examples. Again, depending on actual application, other values may also be used.

In one embodiment, the thin-film material is graphene.

In one embodiment, the thin-film material is any one selected from the group of
molybdenum disulphide,
hexagonal boron nitride,
$Sb_2Te_3$,
$MoTe_2$,
$WS_2$,
$MoSe_2$,
$TaSe_2$,
$Bi_2Te_3$,
$NbSe_2$, and
$NiTe_2$.

It is to be understood that other types of layered thin-film materials may also be identified in a similar way.

In one embodiment, the digital image is a grey-scale image or is converted into a grey-scale image and the number of colour components is one.

In an alternative embodiment, the digital image is a colour image and the number of colour components is three or more.

In one embodiment, the method comprises identification of one or more digital representations of single- and/or few-layer thin-film material in a series of digital images, wherein
determining a background colour component of the digital image for each colour component, and/or
determining or estimating a colour component of thin-film material to be identified in the digital image for each colour component,
is done for each digital image of the series or is done once where the determination(s) are used for later digital images of the series.

It is more exact to determine the background colour and/or the colour of the thin-film material for each image but to do either or both only once and use the determined value(s) is simpler and may be fully sufficient for certain uses.

In one embodiment, the thin-film material of the digital image was located on a given substrate, having a predetermined thickness, when the digital image was captured and wherein determining a background colour component of the digital image for each colour component comprises
providing predetermined information of an approximate range of a background colour component for each colour component as a function of the particular type and a thickness of the given substrate.

In one embodiment, the method further comprises
applying a filter, e.g. a median filter, to the digital image to remove high-frequency noise and/or salt-and-pepper noise before determining a background colour component of the digital image for each colour component,
applying one or more dilation steps followed by one or more erosion steps in order to improve the quality of the digital image for identification of thin-film material,
applying a threshold where all pixels of the digital image are discarded except those pixels that have, for each colour component, a colour component being within a second predetermined range of the determined or estimated colour component of the thin-film material to be identified having the given number of layers, and/or
detecting edges or a contour of at least one part of the digital image that has been identified to be one or more digital representations of single- and/or few-layer thin-film material.

In one embodiment, the obtained pre-determined contrast value for each colour component has been derived as:
the numerical difference between the colour intensity of the background of the given colour component and the colour intensity of the thin-film material to be identified of the given colour component divided by the colour intensity of the background of the given colour component.

According to another aspect, the invention also relates to a system for automatic identification of one or more digital representations of single- and/or few-layer thin-film material in a digital image, the digital image having a predetermined number of colour components, wherein the system comprises one or more processing units adapted to
determine a background colour component of the digital image for each colour component, and
determine or estimate a colour component of thin-film material to be identified in the digital image for each colour component, the thin-film material to be identified having a given number of layers being at least one,
wherein one or more processing units is adapted to determine or estimate a colour component of thin-film material to be identified in the digital image for each colour component by
obtaining a pre-determined contrast value ($C_R$; $C_G$; $C_B$) for each colour component and determining or estimating the colour component of the thin-film material to be identified and having the given number of layers for each colour component by, for each colour component, multiplying a numerical difference between the pre-determined contrast value ($C_R$; $C_G$; $C_B$) for a given colour component and about 1 with the background colour component for the given colour component, and wherein the one or more processing units is further adapted to identify one or more digital representations of single- and/or few-layer thin-film material as points or parts of the digital image that, for each colour component, has a colour component being within a predetermined range of the determined or estimated colour component of the thin-film material to be identified having the given number of layers.

The system and embodiments thereof correspond to the method and embodiments thereof and have the same advantages for the same reasons.

BRIEF DESCRIPTION OF THE DRAWINGS

These and other aspects will be apparent from and elucidated with reference to the illustrative embodiments as shown in the drawings, in which:

FIGS. 5a-5f schematically illustrate the effect of (optional) additional image processing of the image of FIG. 1;

DESCRIPTION OF PREFERRED EMBODIMENTS

Figure 1:
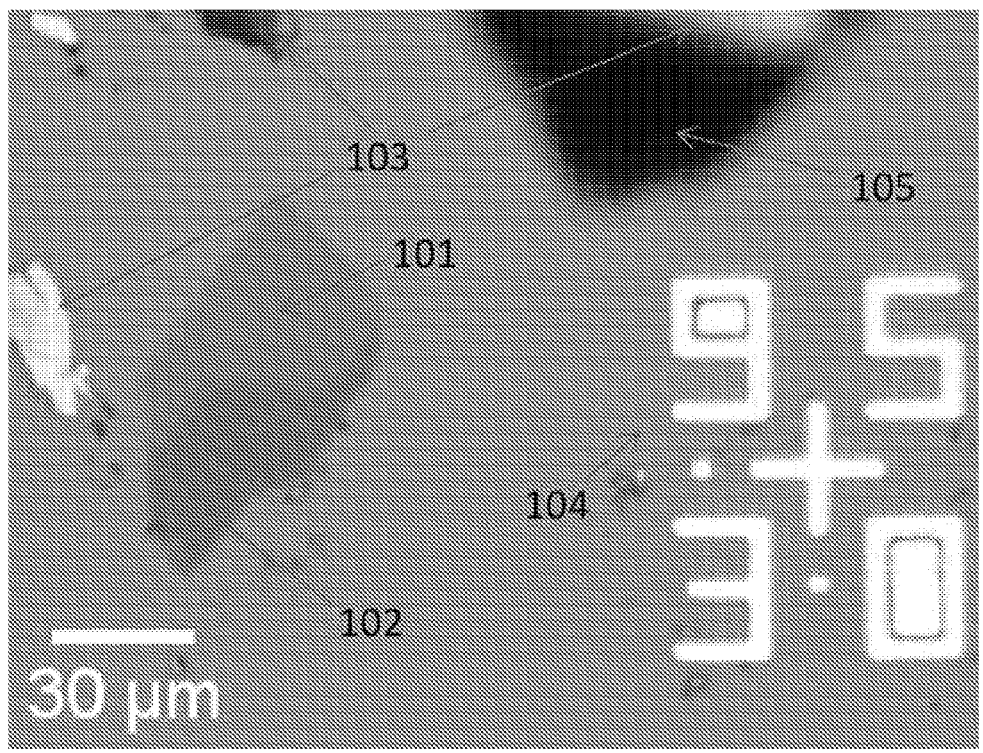
FIG. 1 illustrates a digital image of a substrate comprising single-layer and bi-layer graphene.

FIG. 1 illustrates a digital image of a substrate comprising single-layer and bi-layer graphene obtained by a more or less standard optical microscope. The figure shows a digital representation of a substrate comprising—in this particular example—single-layer graphene 101 as well as bi- 102 and many-layer graphene 103. Many-layer graphene is also referred to as graphite, and is typically considered as graphene with more than 10 layers. Also shown is a shadow 105 cast by a larger piece of many-layer graphene.

This particular exemplary digital image 100 is a segment or part of a larger digital image.

The image also shows (optional) metal index marks or other types of index marks 104, typically physically present on the substrate, enabling identification of where this specific digital image 100 is from in the larger overall substrate. Such marks 104 are also useful for enabling determination of the location of a given item, e.g. an area of single-layer graphene, on the substrate.

In addition, the digital image may comprise digital representations of tape residues, noise, scratches and/or other artifacts.

In this particular example, the substrate is silicon dioxide $SiO_2$ with a thickness of 90 nm on silicon Si. However, other substrates, e.g. poly(methyl methacrylate) on Si or $Al_2O_3$ on Si or Al and/or other thicknesses may equally be used, as long as they provide a numerically significant contrast for the thin-film of interest.

A digital image, such as the one shown in FIG. 1, may be used to identify single-, bi-, tri-, four- and/or few-layer thin-film material, e.g. like graphene, as will be described in further detail as one example in connection with FIG. 2 and elsewhere.

Even though the digital image 100 in this particular example comprises graphene it is to be understood that other images comprising other types of layered thin-film material may also be investigated in a similar manner to identify a given layered thin-film material. As examples of such thin-film materials are e.g. Molybdenum disulphide ($MoS_2$), hexagonal boron nitride (BN), $Sb_2Te_3$, $MoTe_2$, $WS_2$, $MoSe_2$, $TaSe_2$, $Bi_2Te_3$, $NbSe_2$, $NiTe_2$, etc.

As can be seen, the colour of single-layer graphene 101 is close to the colour of the background (i.e. the colour of the substrate) but still distinguishable by a human eye although perhaps not easily so.

Figure 2:
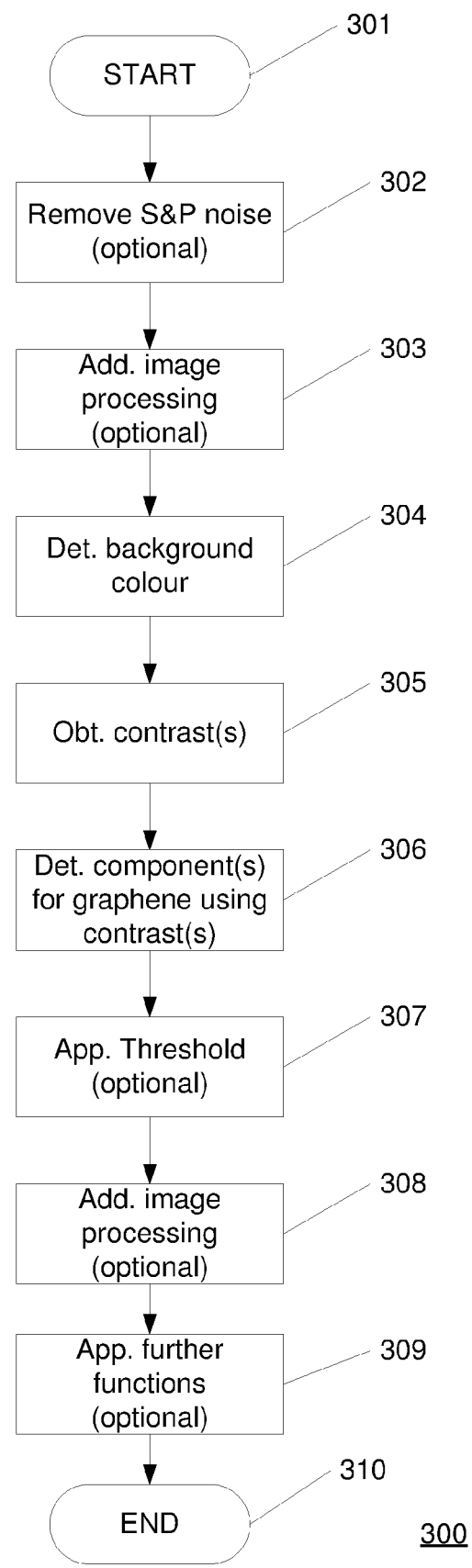
FIG. 2 schematically illustrates a flow-chart of one embodiment of a thin-film material identification method.

FIG. 2 schematically illustrates a flow-chart of one embodiment of a thin-film material identification method. Shown is a flow-chart 300 that starts at step 301. Before or when starting, a digital image (e.g. like the one shown in FIG. 1) is provided or obtained for automatic processing in order to identify single-, bi-, tri-, four- and/or few-layer thin-film material. In the following, graphene on a $SiO_2$ substrate will be used as an example.

At step 302 (an optional step), high-frequency noise—also often referred to as salt-and-pepper noise—is removed in order to obtain a more uniform digital image enabling more reliable detection of one or more regions comprising graphene.

This may e.g. be done by applying a median filter or similar that replaces each pixel value with a median value of the surrounding pixels thereby effectively removing outlying pixels.

A median filter is very effective at removing salt-and-pepper noise while preserving the sharpness of edges and therefore particular useful for enabling or improving precision of area identification and/or of subsequent edge detection if used (see below for step 309) and/or other functions.

Figure 4:
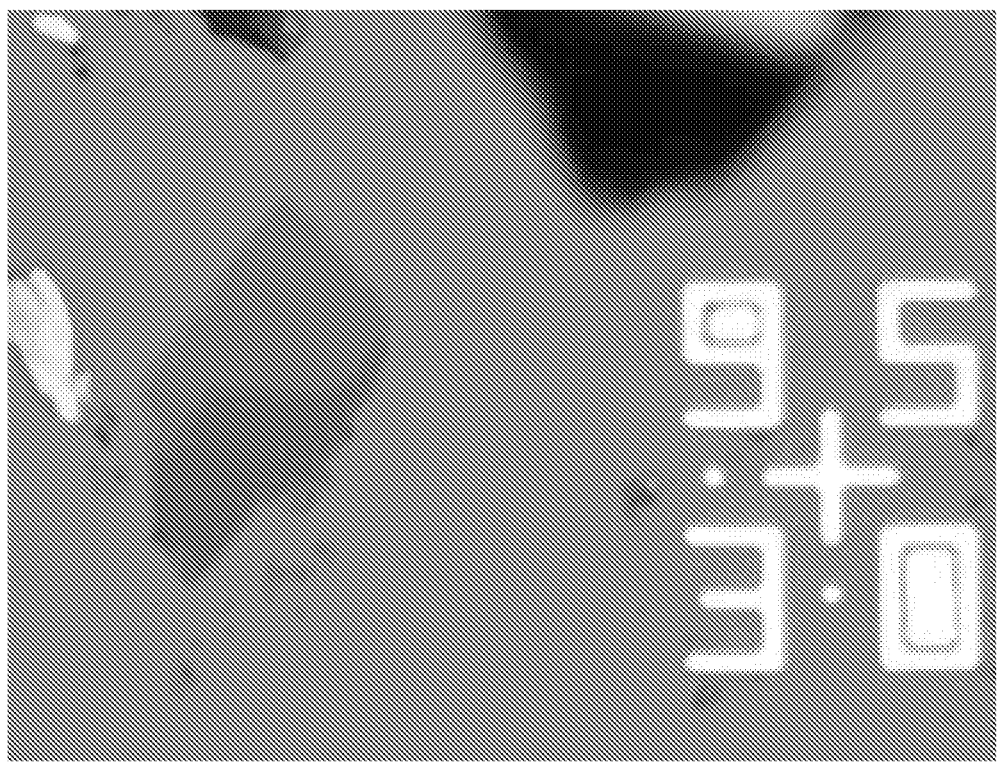
FIG. 4 schematically illustrates the image of FIG. 1 after (optional) image processing removing so-called salt-and-pepper noise without blurring edges in the image.

One example of applying such a filter or function may e.g. be seen in FIG. 4 showing a digital image 100 after a median filter has been applied to the image of FIG. 1. As can be seen, salt-and-pepper/high-frequency noise has been removed or diminished and the image contains more uniform colours.

After step 302, (optional) step 303 is carried out that applies additional image processing to enhance the identification process even further. More particularly, one or more dilation steps or similar is carried out followed by one or more erosion steps or similar. The number of dilation steps need not be equal to the number of erosion steps.

Dilation and its counterpart—erosion—are in their basic form operations in mathematical morphology. Dilation is a convolution of a given image (binary, grey scale, or colour) with a kernel or the like, usually called a local maximum operator. The operation replaces all pixels with the maximum value of the surrounding pixels limited by the size and shape of the kernel. As one example, a square 3×3 pixel kernel may be used. This has e.g. been used in connection with FIGS. 5a-5f but it is to be understood that other shapes and/or sizes of the kernel may be used.

On a border between a darker and a lighter region in a given image, application of dilation will expand the border of the light region (being the same as reducing the border of the dark region) thereby increasing the areas of lighter areas while application of erosion will do the opposite, i.e. expand the border of the dark region (being the same as reducing the border of the light region) thereby increasing the areas of darker areas.

Specifically in connection with identification of graphene (or other thin-film materials), dilation may be used to remove edges around small pieces, spots, or areas of graphite and residues since pixels with a positive pixel contrast (i.e. darker than the background colour) close to the background colour will be eliminated.

Figure 5C:
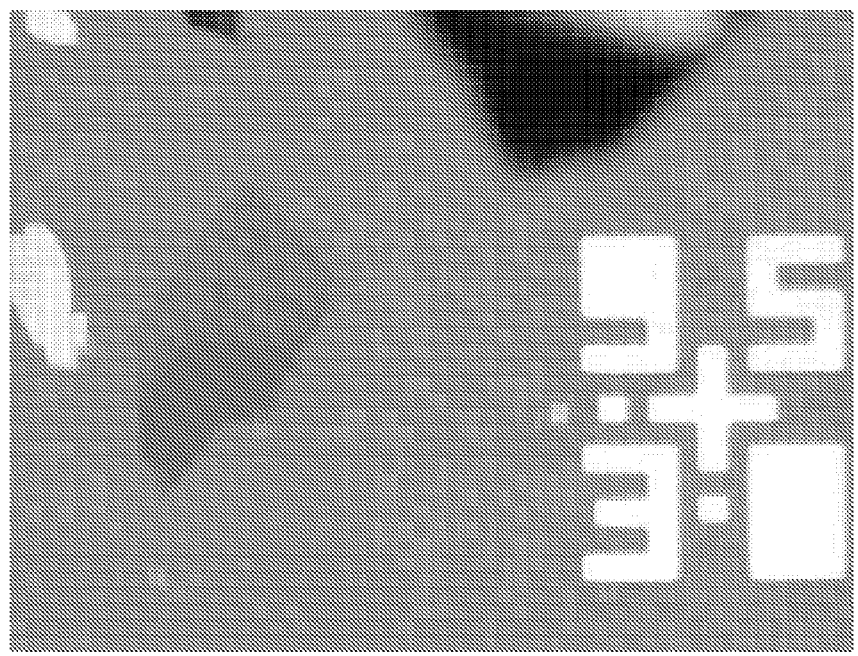

FIGS. 5a-5c illustrate one example of dilation being applied successively a number of times (in this particular example three times) to the image of FIG. 4.

As can be seen, the borders of light regions are expanded and the contribution from edges, etc. is greatly reduced in essence 'cleaning up' the image even further for more accurate processing.

However, the part(s) of the image that corresponds to graphene is reduced in size as well during this process. Therefore, to more accurately obtain more exact boundaries or borders of areas of graphene, one or more applications of erosion is performed afterwards.

Figure 5D:
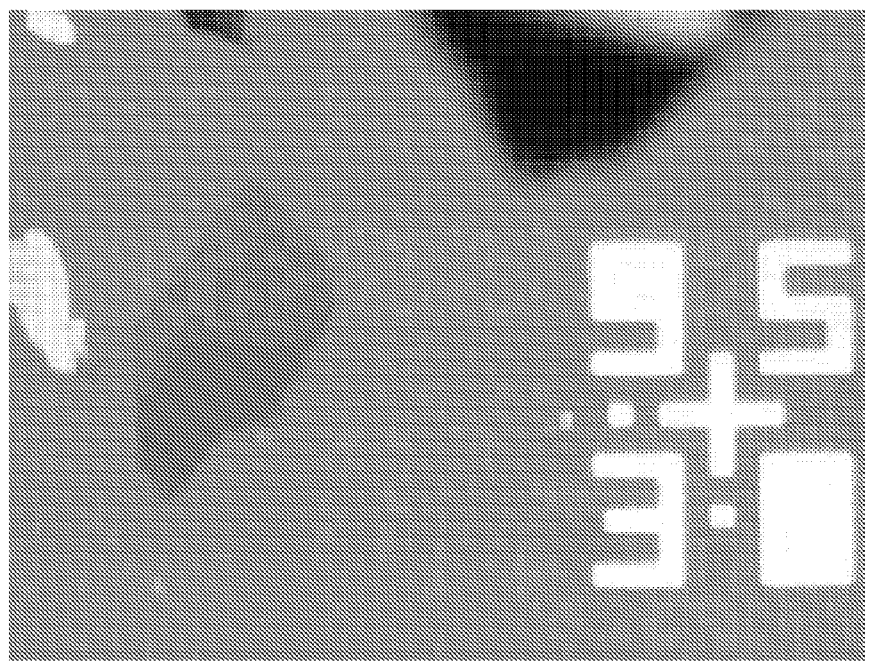
Figure 5E:
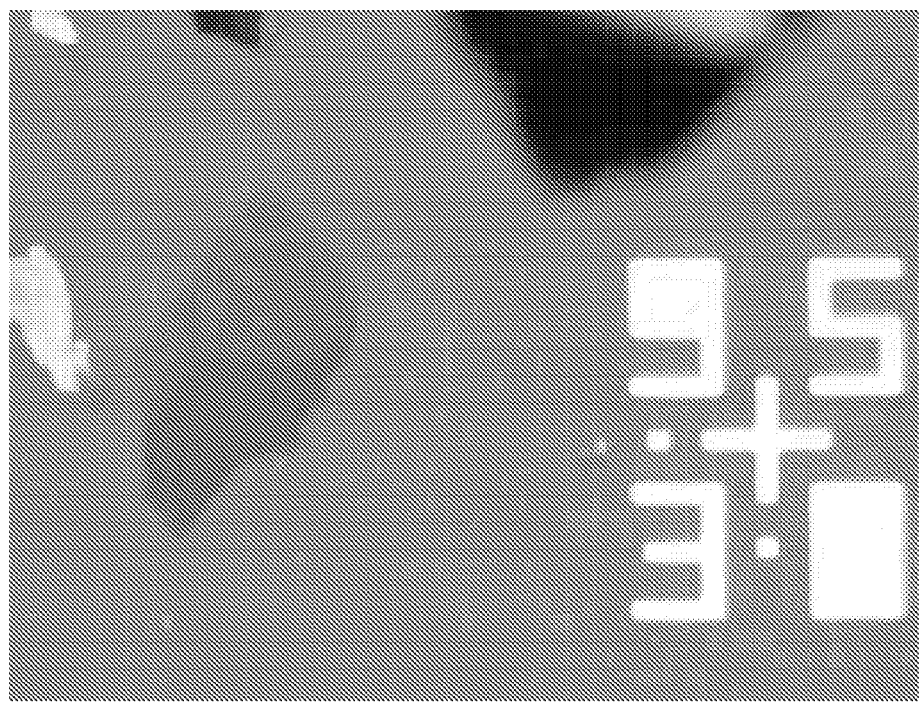
Figure 5F:
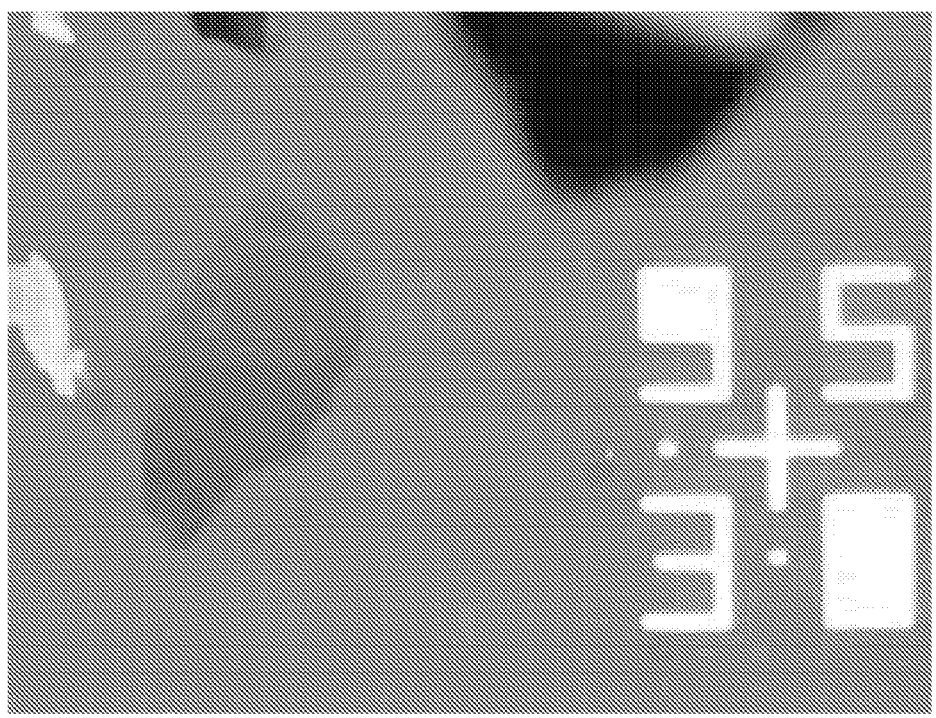

FIGS. 5d-5f shows one example of erosion being applied successively a number of times (in this particular example also three times).

As can be seen, the borders of the dark regions are expanded.

Applying dilation one or more times followed by applying erosion one or more times will (when being balanced but not necessarily equal) reduce or remove smaller and darker parts or elements of the image and then enlarge larger parts or elements more or less back to their original size where parts or elements being removed will not be restored. This in essence further 'cleans up' of the image without removing and/or changing substantial colour and/or edge information for the graphene parts of the image.

After (optional) step 303, step 304 is carried out where the actual colour of the specific background, i.e. the actual colour of the specific substrate, is determined.

It could be tempting simply to register the background colour of a reference image of the used substrate and then simply subtract the reference image, e.g. the RGB values (or similar in another colour space) or grayscale value, from images of one or more wafers to be processed for identification.

However, when obtaining digital images of a substrate comprising graphene (or other thin-film material), the background colour changes over the entire, e.g. 4", wafer. The difference is quite pronounced and may be caused by small variations in the thickness of the substrate, the lamp intensity of an illuminating source, the microscope/image capturing device shutter time, and/or the defocus due to wafer bow, etc.

Preferably, the background colour is determined individually for each image to be processed for identification, e.g. as part of analysis of a series of images, to provide an actual colour of the specific background. Alternatively, the background colour may be determined once and used for subsequent images, which is simpler but not as accurate.

One simple and efficient way to determine the background colour is simply to use predetermined information of an approximate range of a background colour for a given substrate of a given thickness.

This predetermined information for one or more types of substrates may e.g. be stored physically in an appropriate electric memory and/or storage (see e.g. 203 in FIG. 11) for retrieval or use when needed.

For the specific example in FIG. 1, the colour component value of each primary colour components R(ed), G(reen), and B(lue) is known to e.g. be about 175±10, 145±10, 140±10. For grey-scale processing, the single colour component value is known to be about 150±10. It is to be understood, that other intervals may be used instead, e.g. 140±5, 140±15, etc. for each primary colour. The range should not be too narrow (potentially discarding background pixels) or too broad (less of an issue with respect to loosing useful information but then simply wasting processing time and/or effort).

It is also to be understood that other colour spaces or models than RGB may be used, e.g. like HSL (hue, saturation, luminance), HSV (hue, saturation, value), HIS (hue, saturation, and intensity), etc.

Using a colour component value interval and pixel histograms for each primary colour component (or a single colour component interval and histogram for grey-scale images), the actual background colour component values (or grey-scale value) for the specific image may be determined, e.g. by determining a global optimum within the predetermined range for each colour component (or grey-scale value) assuming that the background colour will be the far more dominant colour of the image. This assumption is very safe to make for images of this kind with material located in this manner on a substrate. Alternatively, other methods for determining the background colour could be equally valid.

Figure 3:
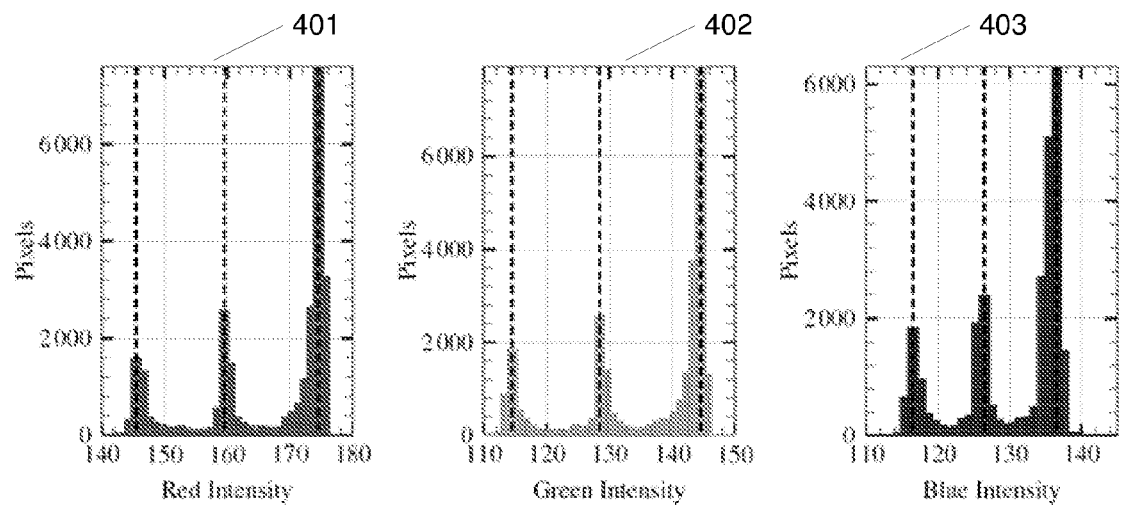
FIG. 3 schematically illustrates a graph of pixel histograms of each colour component obtained for the image of FIG. 1.

This is e.g. illustrated in FIG. 3 showing a pixel histogram for each of R (401), G (402), and B (403) using the RGB colour space. It can easily be seen that the background colour (the rightmost broken line in each pixel histogram) is far the dominant one.

As an alternative, an expected value and range of colour component values are not needed thereby causing the need to determine a global optimum for each colour component over all the available values. This will work equally well for all other embodiments but just require more processing time and/or effort.

To derive one or more pixel histograms from a digital image is fairly straight forward and well known.

When the specific colour component values for the background colour have been determined, the specific colour for graphene is then determined.

Figure 11:
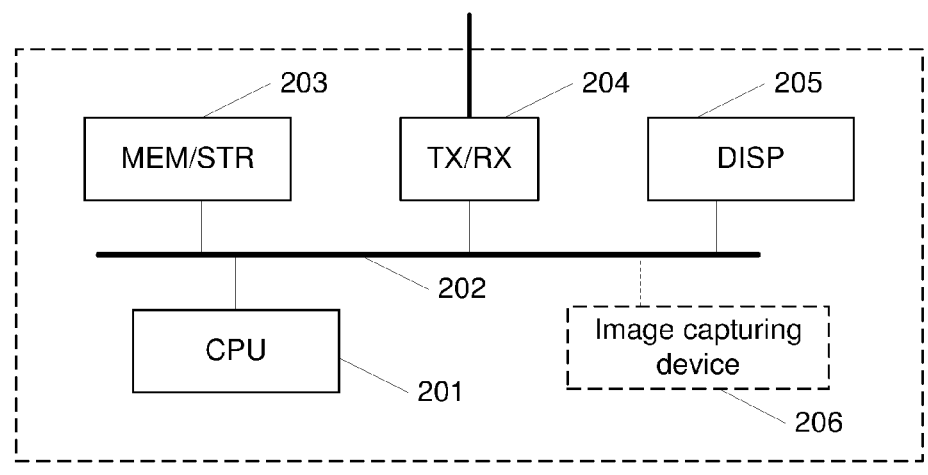
FIG. 11 schematically illustrates one embodiment of a system for automatic identification of a digital representation of single-, bi-, and/or few-layer thin-film material, e.g. graphene, in a digital image.

This is in this embodiment done by first obtaining one or more predetermined contrast values at step 305 e.g. from a suitable memory and/or storage (see e.g. 203 in FIG. 11). For grey-scale images only a single contrast value is obtained while three different contrast values are obtained for a colour image e.g. using R, G, B colour components. It is to be understood that other colour models/spaces than RGB may be used and that the number of colour components may be different from three.

The contrast may be calculated as the difference between the colour intensity, as represented by the values of the colour components, of the background and the colour intensity of graphene of interest divided by the colour intensity of the background, i.e.

$$C = \frac{I_{background} - I_{graphene}}{I_{background}}$$

This also holds for each colour component, e.g.

$$C_{red} = \frac{I_{background,red} - I_{graphene,red}}{I_{background,red}}$$

The inventors have realised and shown that the contrast of graphene of a given type (i.e. being either single, bi-, tri-, four-, or few layer graphene) in a digital image—for a given thickness of the substrate that the graphene is deposited on—is constant (to within a small tolerance)—even for different colour spaces/models—and likewise that the contrast of graphene for each colour component is constant (to within a small tolerance) and uniquely determined by the substrate (and its thickness).

The contrast of graphene of a given layer is distinguishably different from the contrast of graphene of another given layer, e.g. the contrast of single layer graphene is different than the contrast of bi-layer graphene that is different than the contrast of tri-layer graphene, and so on. The contrast of bi-layer graphene is about 2 times the contrast of single-layer graphene, while the contrast of three-layer graphene is about 3 times the contrast of single-layer graphene, etc.

This enables easy and efficient distinction and thereby separate identification of graphene of different layers including graphite.

For example, the R, G, B contrasts [$C_R$; $C_G$; $C_B$] for a digital colour image of single-layer graphene on a 90 nm $SiO_2$ substrate is about [9%; 11%; 8%]. It can vary a bit due to small variations and errors. The inventors have for example experimentally measured contrasts to be e.g. about [8.6%; 10.5%; 8.1%] as well as other examples.

Contrast values (e.g. for each colour component) may simply be measured once for a given substrate as a function of the type of substrate and its thickness and then stored in a suitable memory and/or storage (see e.g. 203 in FIG. 11) for later use.

One way of determining the contrast values for a given substrate with a given thickness is e.g. to manually find a piece of graphene with an optical microscope, capture an image of the piece and measure the contrast. Alternatively one could calculate the contrast by considering light propagation in layered thin-films e.g. by using the Fresnel equations and convert it to an appropriate colour space.

After this predetermination, there is no need to measure it again for the same substrate with the same thickness avoiding the need for further calibration.

The specific value for each colour component of a given-layer graphene may then be determined using such predetermined contrast values [$C_R$; $C_G$; $C_B$] for each colour component and the determined background colour (as determined at step 304) also for each component.

This is done at step 306 where the identified background colour components, each is multiplied by the result of 1 minus the contrast of the same colour component of the graphene in question (or the absolute value of the contrast of the same colour component of the graphene in question minus 1). It is to be understood that using values close to 1 may still give usable results. The preferred degree of how close to 1 the value should be may depend on actual application. Examples of a value to use instead of exactly 1—e.g. depending on actual application—are e.g. values from 0.95 to 1.00; values from 0.90 to 1.00; values from 1.00 to 1.05; values from 1.00 to 1.10 with e.g. 1.00; 0.99; 0.98; 0.97; 0.96; 0.95; 0.94; 0.93; 0.92; 0.91; 0.90; 1.01; 1.02; 1.03; 1.04; 1.05; 1.06; 1.07; 1.08; 1.09; 1.10 being specific examples. Again, depending on actual application, other values may also be used.

For example, for single-layer graphene where the red component background colour intensity has been determined to be 175 and the predetermined red contrast value $C_R$ has been retrieved to be 9%, the result will be 175×(1-9%) being equal to about 159 signifying that single-layer graphene's red colour component has a value of about 159 in the actual image. This corresponds to the peak in pixel values seen in the red histogram around 159 in FIG. 3. In a similar way, the values for green and blue are determined.

When these values are determined, the actual (or a very good estimate thereof) colour of the given type of graphene with the given number of layers in the given image is determined. Areas or regions containing that particular type of graphene with that particular number of layers (being at least one) may then easily be identified e.g. simply by finding the parts of the image that have the same colour component values—preferably within a given range. This may e.g. be done simply searching for pixels in the image having the corresponding values (e.g. within a certain range) for each colour component.

As an example continuing the above, if the single-layer graphene's red colour component has a value of 159 then all pixels having a red colour value within the range of e.g. 159±5 (and also fulfilling having a value within the suitable range for both green and blue) is determined to contain single-layer graphene.

If other types of graphene, e.g. bi-layer graphene, are to be identified in the image as well, that may be derived in the same manner using the predetermined contrasts for the particular types of graphene.

However, simply searching for pixels is not efficient. Alternatively, the relevant pixels may be determined according to (optional) steps 307 and 308 as will be described in the following.

Having determined the colour values for a particular type of graphene, a threshold is applied at step 307, where all pixels are discarded (e.g. set to the colour black) except those pixels having values corresponding to a suitable relatively small range around values of the particular type of graphene. The remaining pixels may then be set to another colour, e.g. white. An exemplary result of this may be seen in FIG. 6 for single-layer graphene.

It is important to note, that the threshold is applied to the three RGB colours together. If a given RGB pixel obeys the pixel-contrast (i.e. is within the relevant value range) for anything less than all three colours then it is discarded. Using constraints on three colours results in a much higher accuracy than in grey-scale images where the three RGB colours are flattened into a single grey-scale colour, e.g. according to grey intensity=0.3×red intensity+0.59×green intensity+0.11×blue intensity or similar.

However, the process may still be used on grey-scale image—but then with less precision—whereby the threshold is applied only for a single grey-scale colour.

Figure 8:
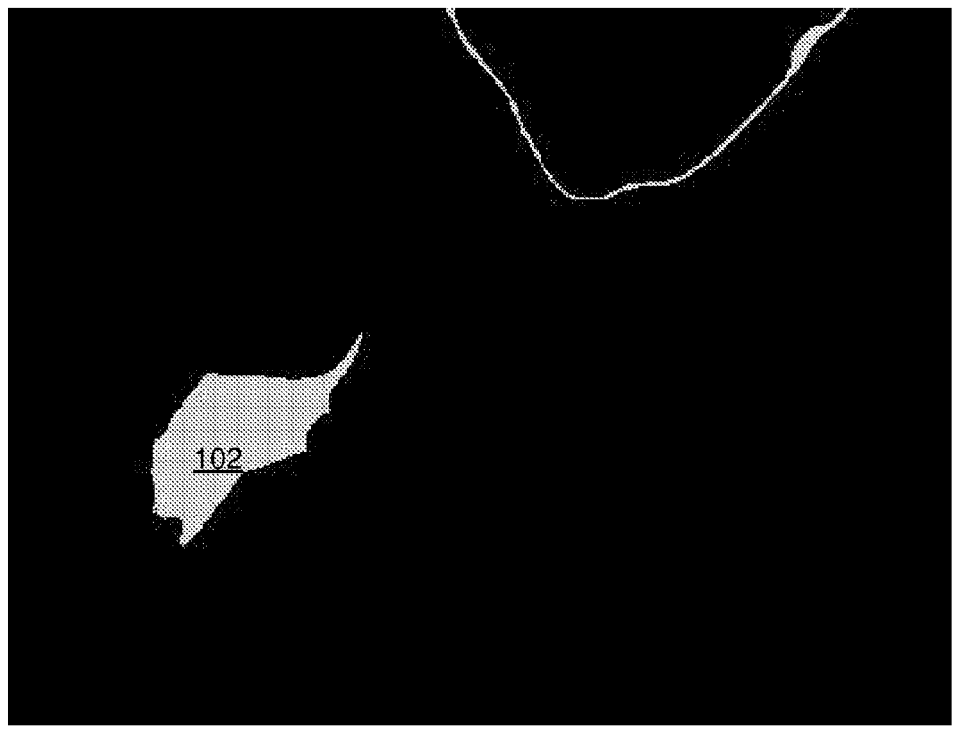
FIG. 8 schematically illustrates the image of FIG. 1 after bi-layer graphene has been identified and non-graphene has been removed.

If several types of graphene are determined, they may each be given their unique colour, e.g. single-layer graphene may be set to white, bi-layer graphene may be set to one given shade of grey, etc. FIG. 8 shows an example of bi-layer graphene.

Figure 6:
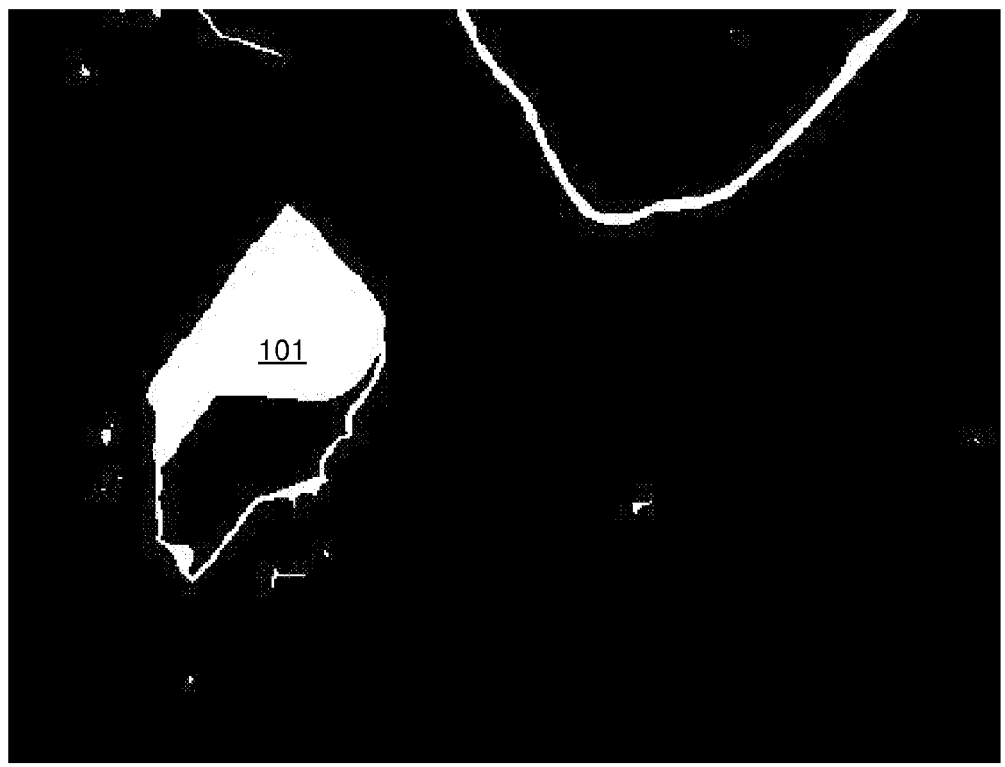
FIG. 6 schematically illustrates the image of FIG. 1 after single-layer graphene has been identified and non-graphene has been removed.

However, the obtained threshold image may still contain some artifacts and noise—as also can be seen in FIGS. 6 and 8. This may be removed, e.g. according to (optional) step 308, where one or more steps of erosion followed by one or more steps of dilation is performed.

Alternatively, other filters may be applied achieving the same effect.

This effectively removes remnants of non-graphene pixels. While the combined erode and dilate steps serve to mostly preserve the area and shape of the graphene it should be noted that thin features will also be eliminated. However, that is not normally an issue as thin areas of graphene (should the thin feature really represent this) is not normally of interest for further processing.

Figure 7:
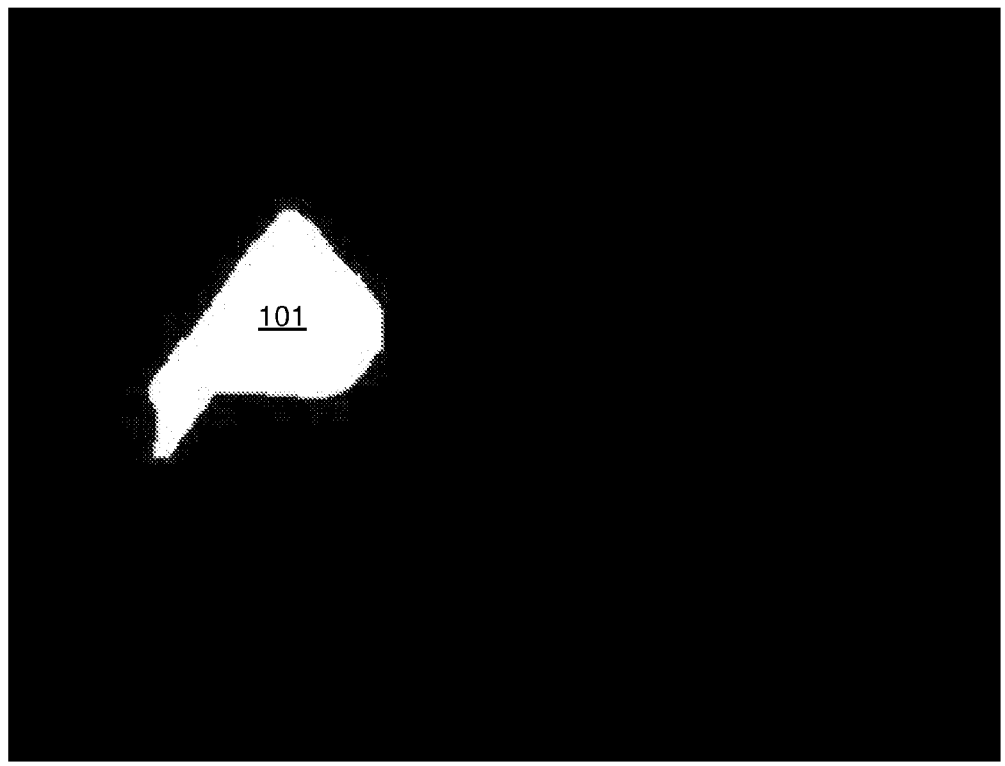
FIG. 7 schematically illustrates FIG. 6 after some additional image processing removing noise and/or artifacts.
Figure 9:
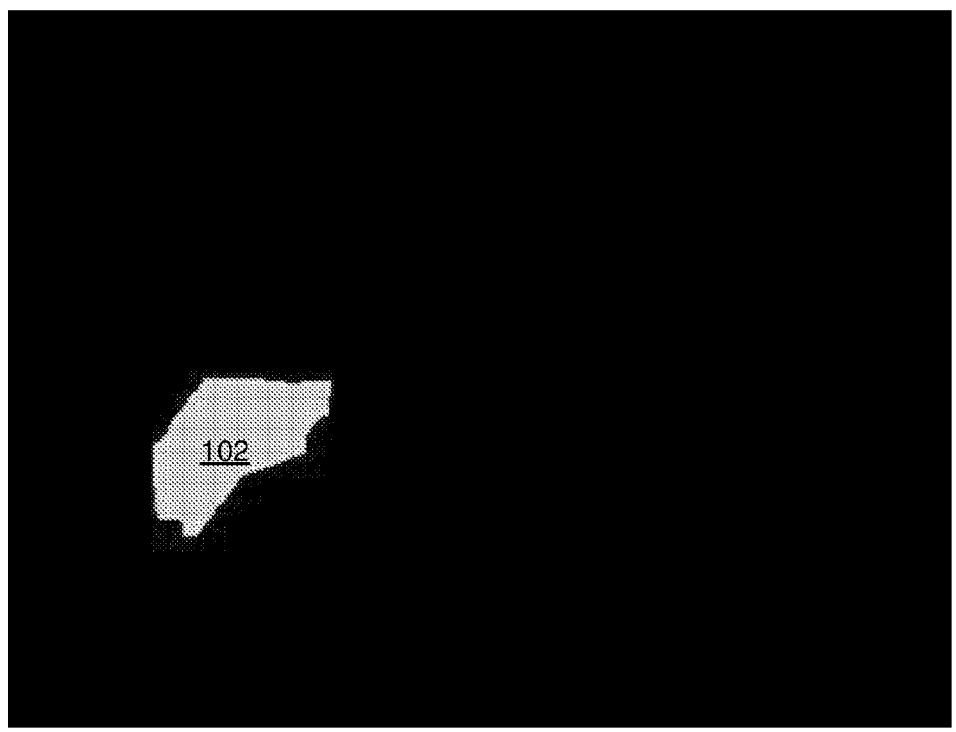
FIG. 9 schematically illustrates FIG. 8 after some additional image processing removing noise and/or artifacts.

FIGS. 7 and 9 show the images of FIGS. 6 and 8, respectively, after application of erosion followed by dilation and an area of graphene can clearly be seen and has been efficiently identified as such.

The procedure might end now. However, in some embodiments, further functions may (optionally) be applied as in step 309 depending on the use thereof. These functions may e.g. comprise applying an appropriate edge- or contour detection algorithm, e.g. enabling more quantitative information about a given area of graphene to be derived.

When the contour/all the edges of a given graphene area has been determined, it is simple to calculate one or more parameters like area, perimeter, circularity, pseudo-length, pseudo-width, etc. Circularity represents the ratio of actual perimeter to that of a circle with the same area. Pseudo-length is the length of a rectangle with the given area and perimeter while the pseudo-width is pseudo-length divided by the area.

Such parameters may be useful in characterising the graphene areas. Especially area and circularity may be important parameters or constraints for detection of suitable graphene areas e.g. for use to be post-processed with E-beam lithography for Hall-bar devices requiring a certain length and width or for other uses.

A location of a graphene area on the substrate or wafer may be determined using the index marks of the image. This location information may e.g. (together with other relevant parameters) be used in a CAD program or similar enabling automatic optimised placement of devices in the identified graphene areas. This could include the identification of position and/or orientation of individual domains of graphene grown on Cu, Ni, SiC, Ru, Ir and similar materials before or after transfer processes and processing.

Figure 10:
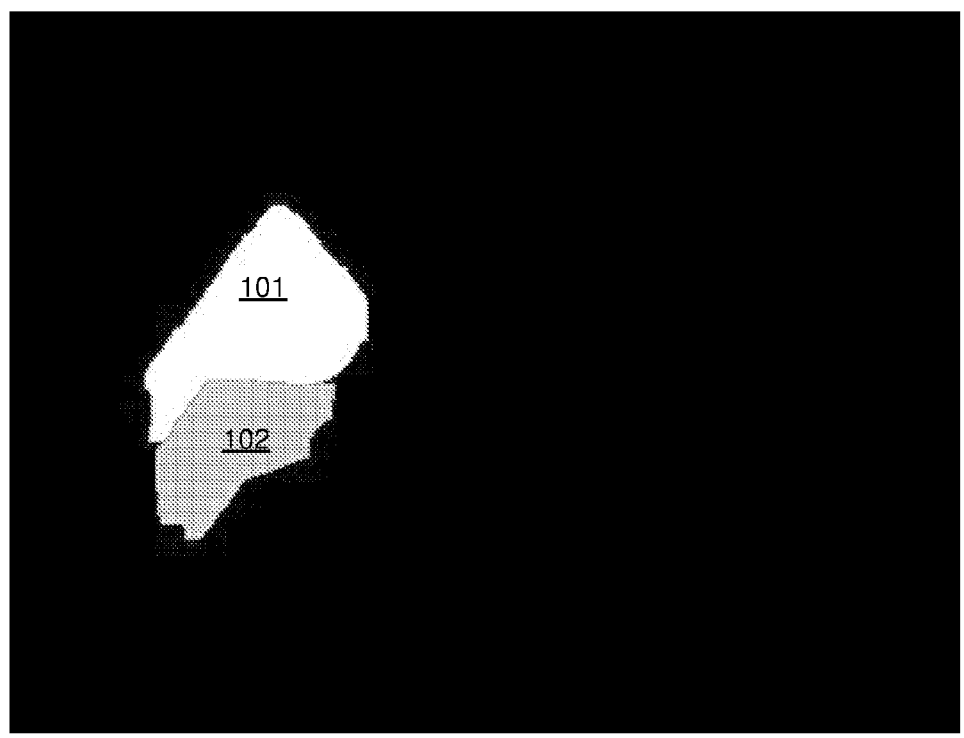
FIG. 10 schematically illustrates the end result of processing the image of FIG. 1 showing both identified single- and bi-layer graphene.

FIG. 10 shows the end result of processing the image of FIG. 1 showing both identified single- and bi-layer graphene.

By optional steps is to be understood that they need not be present, even though they can be, in the procedure performing the identification, as opposed to being present but not invoked.

After one image has been processed and one or more e.g. differently layered graphene areas has/have been identified, the method may loop back to step 301 or 302 and process another image if applicable. This may e.g. be continued until all images of a wafer or similar has been processed and can also continue for more wafers.

It is to be understood that the execution order of steps 304 and 305 e.g. may be switched or even done in parallel. As another alternative, step 302 may be done after step 303.

FIG. 3 schematically illustrates a graph of pixel histograms of each colour component obtained for an area around the single- and bi-layer graphene in FIG. 1 to make the information more clear. Alternatively, they may be derived for the entire image. Shown is a pixel histogram for each of the colour components R (401), G (402), and B (403). The rightmost dashed line is for the background colour, the middle dashed line is for single-layer graphene, while the left dashed line is for bi-layer graphene.

FIG. 4 schematically illustrates the image of FIG. 1 after (optional) image processing removing so-called salt-and-pepper noise without blurring edges in the image. Shown is a processed digital image 100.

FIGS. 5a-5f schematically illustrate the effect of (optional) additional image processing of the image of FIG. 1.

FIGS. 5a-5c illustrate the effect of applying dilation three times (one application per Figure).

FIGS. 5d-5f illustrate the effect of applying erosion three times (one application per Figure).

FIG. 6 schematically illustrates the image of FIG. 1 after single-layer graphene has been identified and non-graphene has been removed with some artifacts and noise still present.

FIG. 7 schematically illustrates FIG. 6 after some additional image processing removing noise and/or artifacts.

FIG. 8 schematically illustrates the image of FIG. 1 after bi-layer graphene has been identified and non-graphene has been removed.

FIG. 9 schematically illustrates FIG. 8 after some additional image processing removing noise and/or artifacts.

FIG. 10 schematically illustrates the end result of processing the image of FIG. 1 showing both identified single- and bi-layer graphene.

The contents and actions of FIGS. 4-10 have been explained in more detail in connection with the flow chart of FIG. 2.

FIG. 11 schematically illustrates one embodiment of a system for automatic identification of a digital representation of single-, bi-, and/or few-layer thin-film material, e.g. graphene, in a digital image. Shown is a system 200 comprising at least one processing unit 201 connected via one or more communications and/or data buses 202 to a memory and/or storage 203, optional communications elements 204 e.g. for communicating via a network, the Internet, a Wi-Fi connection, and/or the like, and an (optional) display 205.

The system 200 may be a more or less standard computational system, like a PC, laptop, tablet, etc. or any other appropriate system suitably programmed to carry out the method or procedure as described in the various embodiments throughout the specification and variations thereof.

The system 200 optionally also comprises an image capturing device 206 for obtaining images like the one shown in FIG. 1. Alternatively, such an image may simply be provided to the system 200.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The mere fact that certain measures are recited in mutually different dependent claims does not indicate that a combination of these measures cannot be used to advantage.

It will be apparent to a person skilled in the art that the various embodiments of the invention as disclosed and/or elements thereof can be combined without departing from the scope of the invention.

The invention claimed is:

1. A method of automatically identifying one or more digital representations of single- and/or few-layer thin-film material in a digital image, the digital image having a predetermined number of colour components, and the method comprising:

determining a background colour component of the digital image for each colour component, and determining or estimating a colour component of thin-film material to be identified in the digital image for each colour component, the thin-film material to be identified having a given number of layers being at least one, wherein the determining or estimating a colour component of thin-film material to be identified in the digital image for each colour component comprises:

obtaining a pre-determined contrast value for each colour component and determining or estimating the colour component of the thin-film material to be identified and having the given number of layers for each colour component by, for each colour component, multiplying a numerical difference between the pre-determined contrast value for a given colour component and about 1 with the background colour component for the given colour component, and wherein the method further comprises:

identifying one or more digital representations of single- and/or few-layer thin-film material as points or parts of the digital image that, for each colour component, has a colour component being within a predetermined range of the determined or estimated colour component of the thin-film material to be identified having the given number of layers.

2. The method according to claim 1, wherein the thin-film material is graphene.

3. The method according to claim 1, wherein the thin-film material is selected from the group consisting of:
molybdenum disulphide,
hexagonal boron nitride,
$Sb_2Te_3$,
$MoTe_2$,
$WS_2$,
$MoSe_2$,
$TaSe_2$,
$Bi_2Te_3$,
$NbSe_2$, and
$NiTe_2$.

4. The method according to claim 1, wherein
the digital image is a grey-scale image or is converted into a grey-scale image and the number of colour components is one, or
the digital image is a colour image and the number of colour components is three or more.

5. The method according to claim 1, wherein the method comprises identification of one or more digital representations of single- and/or few-layer thin-film material in a series of digital images, wherein:
determining a background colour component of the digital image for each colour component, and/or
determining or estimating a colour component of thin-film material to be identified in the digital image for each colour component,
is done for each digital image of the series or is done once where the determination(s) are used for later digital images of the series.

6. The method according to claim 1, wherein the thin-film material of the digital image was located on a given substrate, having a predetermined thickness, when the digital image was captured and wherein determining a background colour component of the digital image for each colour component comprises:
providing predetermined information of an approximate range of a background colour component for each colour component as a function of the particular type and a thickness of the given substrate.

7. The method according to claim 1, wherein the method further comprises:
applying a filter, to the digital image to remove high-frequency noise and/or salt-and-pepper noise before determining a background colour component of the digital image for each colour component,
applying one or more dilation steps followed by one or more erosion steps in order to improve the quality of the digital image for identification of thin-film material,
applying a threshold where all pixels of the digital image are discarded except those pixels that have, for each colour component, a colour component being within a second predetermined range of the determined or estimated colour component of the thin-film material to be identified having the given number of layers, and/or
detecting edges or a contour of at least one part of the digital image that has been identified to be one or more digital representations of single- and/or few-layer thin-film material.

8. The method according to claim 1, wherein the obtained pre-determined contrast value for each colour component has been derived as:
the numerical difference between the colour intensity of the background of the given colour component and the colour intensity of the thin-film material to be identified of the given colour component divided by the colour intensity of the background of the given colour component.

9. A system for automatic identification of one or more digital representations of single- and/or few-layer thin-film material in a digital image, the digital image having a predetermined number of colour components, wherein the system comprises one or more processing units adapted to:
determine a background colour component of the digital image for each colour component, and
determine or estimate a colour component of thin-film material to be identified in the digital image for each colour component, the thin-film material to be identified having a given number of layers being at least one,
wherein one or more processing units is adapted to determine or estimate a colour component of thin-film material to be identified in the digital image for each colour component by:
obtaining a pre-determined contrast value for each colour component and determining or estimating the colour component of the thin-film material to be identified and having the given number of layers for each colour component by, for each colour component, multiplying a numerical difference between the pre-determined contrast value for a given colour component and about 1 with the background colour component for the given colour component,
and wherein the one or more processing units is further adapted to:
identify one or more digital representations of single- and/ or few-layer thin-film material as points or parts of the digital image that, for each colour component, has a colour component being within a predetermined range of the determined or estimated colour component of the thin-film material to be identified having the given number of layers.

10. The system according to claim 9, wherein the thin-film material is graphene.

11. The system according to claim 9, wherein the thin-film material is selected from the group consisting of:

molybdenum disulphide,
hexagonal boron nitride,
$Sb_2Te_3$,
$MoTe_2$,
$WS_2$,
$MoSe_2$,
$TaSe_2$,
$Bi_2Te_3$,
$NbSe_2$, and
$NiTe_2$.

12. The system according to claim 9, wherein
the digital image is a grey-scale image or is converted into a grey-scale image and the number of colour components is one, or
the digital image is a colour image and the number of colour components is three or more.

13. The system according to claim 9, wherein the system is adapted to identify one or more digital representations of single- and/or few-layer thin-film material in a series of digital images, wherein:
determining a background colour component of the digital image for each colour component, and/or
determining or estimating a colour component of thin-film material to be identified in the digital image for each colour component,
is done for each digital image of the series or is done once where the determination(s) are used for later digital images of the series.

14. The system according to claim 9, wherein the thin-film material of the digital image was located on a given substrate, having a predetermined thickness, when the digital image was captured and wherein the one or more processing units is adapted to determine a background colour component of the digital image for each colour component by:
providing predetermined information of an approximate range of a background colour component for each colour component as a function of the particular type and a thickness of the given substrate.

15. The system according to any claim 9, wherein the one or more processing units is further adapted to:
apply a filter to the digital image to remove high-frequency noise and/or salt-and-pepper noise before determining a background colour component of the digital image for each colour component,
apply one or more dilation steps followed by one or more erosion steps in order to improve the quality of the digital image for identification of thin-film material,
apply a threshold where all pixels of the digital image are discarded except those pixels that have, for each colour component, a colour component being within a second predetermined range of the determined or estimated colour component of the thin-film material to be identified having the given number of layers, and/or
detect edges or a contour of at least one part of the digital image that has been identified to be one or more digital representations of single- and/or few-layer thin-film material.

16. The system according to claim 9, wherein the obtained pre-determined contrast value for each colour component has been derived as:
the numerical difference between the colour intensity of the background of the given colour component and the colour intensity of the thin-film material to be identified of the given colour component divided by the colour intensity of the background of the given colour component.

* * * * *